April 21, 1970 L. P. SWEANY ET AL 3,508,041

FLASHING TIE CLASP

Filed Aug. 31, 1966 2 Sheets-Sheet 1

INVENTORS
LOUIS P. SWEANY
ROBERT L. MEEK, JR.
BY
Robert [signature]
ATTORNEY

INVENTORS
LOUIS P. SWEANY
ROBERT L. MEEK, JR.
BY
ATTORNEY

United States Patent Office
3,508,041
Patented Apr. 21, 1970

3,508,041

FLASHING TIE CLASP

Louis P. Sweany, Indianapolis, and Robert L. Meek, Jr., Greensburg, Ind., assignors to P. R. Mallory & Co. Inc., Indianapolis, Ind., a corporation of Delaware Filed Aug. 31, 1966, Ser. No. 577,110
Int. Cl. F21v *33/00*
U.S. Cl. 240—6.4 5 Claims

ABSTRACT OF THE DISCLOSURE

The combination of a piece of jewelry and a light source periodically activated by a solid state flasher means.

This invention relates to a novel article of manufacture and, more specifically, to electronically oriented types of jewelry such as tie clasps, cuff links, earrings, brooches, hair ornaments and the like. The novelty resides in the use of an electronic flasher circuit to light a self-contained lamp at discrete intervals and powered by an attached replaceable battery.

Ornaments of similar function, presently available, are of the type which are lit continuously or which are connected to a separately-operated switch which opens and closes the lamp circuit at a predetermined rate. This is far from being completely satisfactory as wires connect the lamps to the flasher and power source. The wires must, perforce, be small to avoid conspicuousness and are subject to tangling, breakage, short or open circuits and other problems. In addition, such wires tend to restrict the movements of the wearer.

Therefore, it is a primary object of this invention to eliminate external wires to the manufactured article.

Furthermore, it is another object of this invention to produce jewelry featured by a flashing light activated by a solid-state flasher.

Also, it is another object of this invention to activate the flasher from a replaceable battery which snaps into place and also functions as a switch.

Yet another object of this invention is to provide for easily insertable colored filters to secure various colors of light.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of this invention will be readily apparent as the invention is described in detail and pictured in the accompanying drawings.

Generally speaking, the invention can be described in one of its embodiments as a necktie clasp having, on the exposed side, a small incandescent lamp bulb partially projecting from the surrounding surface which covers the electronic circuit. The latter utilizes a printed circuit board on which is mounted three capacitors, six resistors and three transistors. Two of the transistors are connected in a free-running multivibrator mode while the third transistor acts as an electronic switch and causes current to flow through the filament of a small incandescent lamp for a time dependent on the values of resistance and capacitance as is well-known in the art. A small hearing-aid-type battery consisting of a single cell powers the unit and is mounted at one end of the clasp so it can be moved slightly, thereby opening or closing the circuit.

A thin transparent colored plastic strip may be inserted between locating flanges on the face of the unit to obtain other colors of light flashes.

A typical embodiment of this invention is described herein, as applied to a necktie clasp. Many other embodiments are feasible using the principles and techniques described in this specification. Therefore, this embodiment is intended to be generally descriptive and not limiting in scope.

In the accompanying drawings, similar items in different views are referred to by similar numbers.

A brief description of the accompanying drawings follows:

FIGURE 1 is a top view of tie clasp incorporating the invention.

FIGURE 1–A is a detailed sectional enlargement of the battery-end of that tie clasp.

Figures 1, 1A, 2:
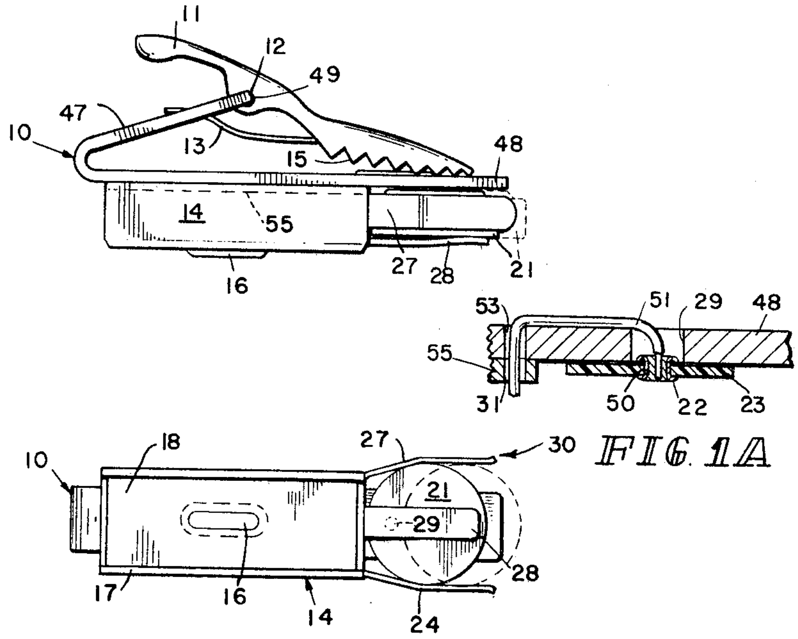
FIGURE 2 is a front view of that tie clasp incorporating the invention.

This embodiment of the invention, as shown in the drawings consists of a number of individual parts assembled into a single final entity. For the sake of clarity, such parts will be listed and described herewith and the assembly of those parts will be explained subsequently.

The main bracket 10 consists of a metal strip formed acutely so that there is a long leg 48 and a short leg 47 extending from the arcuate portion. The short leg 47 is notched at the free end to permit the insertion of the cantilever spring 13. Terminating the notch are two pivots 12 opposing each other and of a size to fit freely in corresponding holes 49 in the clamping arm 11. The long leg 48 has a hole 29 pierced near the free end.

The trough 14 consists of a rectangular box with four sides and a bottom with rather thin walls. A small hole 31 in the bottom is provided to accommodate an insulated wire 51. Opposing flanges 17 are formed lengthwise.

A battery clamp 30 consists of a spring-brass bracket having three spring fingers 24, 27, 28 extending at right angles to the base. Two fingers 24, 27 are biased slightly toward each other and one of them 27 has two detent 25, 26 projecting towards the opposite finger 24. The third finger 28 is located between the opposing fingers 24, 27 and slightly offset.

The clamping arm 11 is channel-shaped with saw-tooth notches 15 at one end and transversely located pivot holes 49 near the center.

The cantilever spring 13 is rectangularly-shaped and capable of being deflected to the maximum jaw opening without taking a permanent set.

A small eyelet 22 serves as a contact.

A thin insulative strip 23 has a hole 50 to fit the eyelet 22.

A colored plastic strip 19 is provided with a blister 20 which fits over the protruding lamp bulb 16.

A printed circuit board 32 consisting of an etched copper circuit 39 on a phenolic laminate 52 of a size to fit within the trough 14.

The lamp 16 is manufactured by American Cystoscope Makers, Inc., and listed as their #540–049.

Transistors 33, 34, 35 manufactured by Raytheon as their type CK–22A.

Capacitors 36, 37, 38 are manufactured by Transistor Electronics, Inc.: their #TE4–2Z.

"P" terminals 40 manufactured by P. R. Mallory & Co.

"A" terminals 56 manufactured by P. R. Mallory & Co.

Pellet resistors 41, 42, 43, 44, 45, 46 manufactured by P. R. Mallory & Co.

A thin insulative board 55 of a size to fit loosely in the trough 14 and with a hole corresponding to the hole in the bottom of the trough.

Epoxy 18 for encapsulating.

Mercury cell 21 manufactured by P. R. Mallory & Co. (RM–675). The battery may be a single cell mercury battery having an open circuit voltage of about 1.25 volts.

Figure 3:
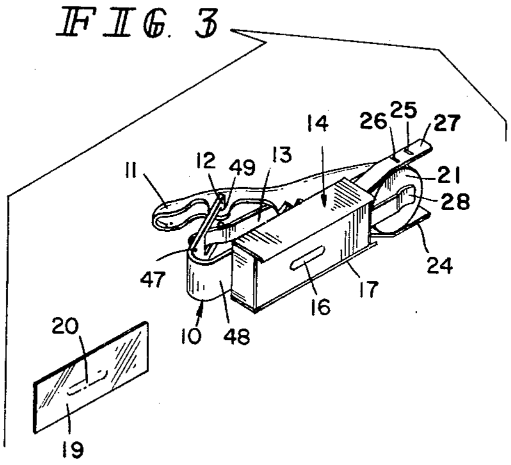
FIGURE 3 is a perspective view of the invention.

The above parts are assembled as shown in FIGURES 1, 2 and 3 and described below:

The main bracket 10 is soldered or welded to the trough 14 so the feed-through hole 53 in the long leg 48 of the main bracket 10 is concentric with the clearance hole 31 in the trough 14. The eyelet 22 is crimped to the insulative strip 23 and the subassembly cemented to the trough side of the long leg 48 of the bracket 10 with the eyelet 22 concentric with the clearance hole 29 in that long leg 48. A short piece of insulated copper wire 51 is stripped of insulation at both ends and one end inserted in the eyelet 22 and soldered. The other end of the wire is inserted in the aligned holes 29, 31 in the trough 14 and long leg 48 respectively, and is held against the bracket 10 by a thin coating of epoxy cement.

Figure 4:
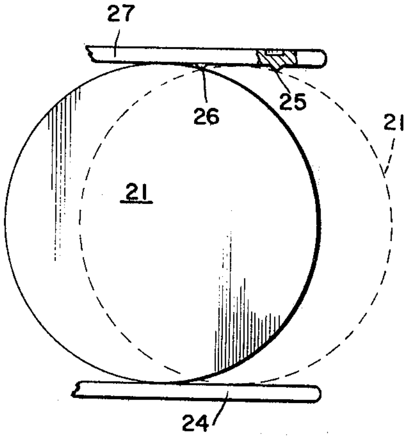
FIGURE 4 is an enlarged detail of the battery retaining bracket.

The battery clamp 30 is attached to the trough 14 by soldering or welding so the battery 21 is securely held in either an "in" or "out" position. FIGURE 4 shows the battery 21 in both positions. When the battery is in the "in" position, its negative terminal makes contact with the eyelet 22 and current flows from the battery. When the battery is in the "out" position, an air gap is established between the eyelet and the battery terminal and the circuit is broken, thus stopping the flow of current. Coined projections 25, 26 in one of the tangential arms 27 act as indexing means to hold the battery in the desired position. Moving the battery beyond the "out" position results in removal of the battery.

The printed circuit board 32 may be made from a copper-faced 39 phenolic laminate 52 by the usual technique of printing a resist on the copper, corresponding to the circuit desired, and etching away the exposed copper and removing the remaining resist with a solvent. Lead holes are drilled through the board at each solder pad.

The pellet resistors 41, 42, 43, 44, 45, 46 are connected to "P" terminals 40 and "A" terminals 56 in the manner described in detail in Patent 3,193,611. These subassemblies are mounted on the unclad side of the printed circuit board 32 so the tips of the "P" and "A" terminals protrude slightly from the circuit side. The resistors are all rated 0.1 watt dissipation and have the following resistance values: 1000 ohms 41; 47K ohms 42; 220,000 ohms 43; 180 ohms 44; 200 ohms 45, 46. The axial leads of the three capacitors 36, 37, 38 are bent at right angles and inserted through the board and the excess wire cut off. Likewise, the three transistors 33, 34, 35 are attached to the board in the same manner. The leads of the lamp 16 are also bent at right angles to the longitudinal axis, inserted through the appropriate holes and cut off. The bare ground wire 54 is inserted in its hole and the protruding terminals all soldered to the copper circuit 39.

Figure 5:
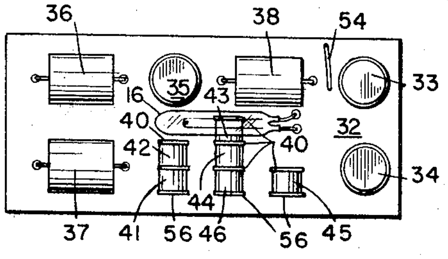
FIGURE 5 is a top view of the printed circuit board with components mounted thereon.
Figure 6:
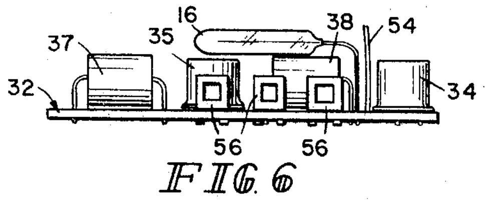
FIGURE 6 is a front view of the printed circuit board showing components mounted on the top side.
Figure 7:
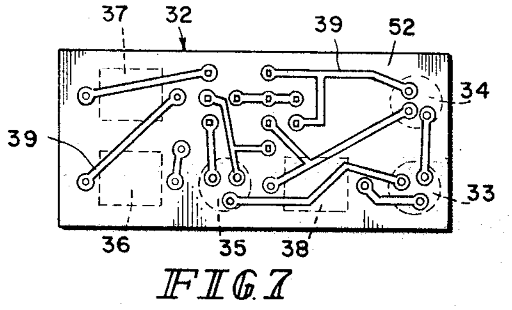
FIGURE 7 is a bottom view of the printed circuit board.
Figure 8:
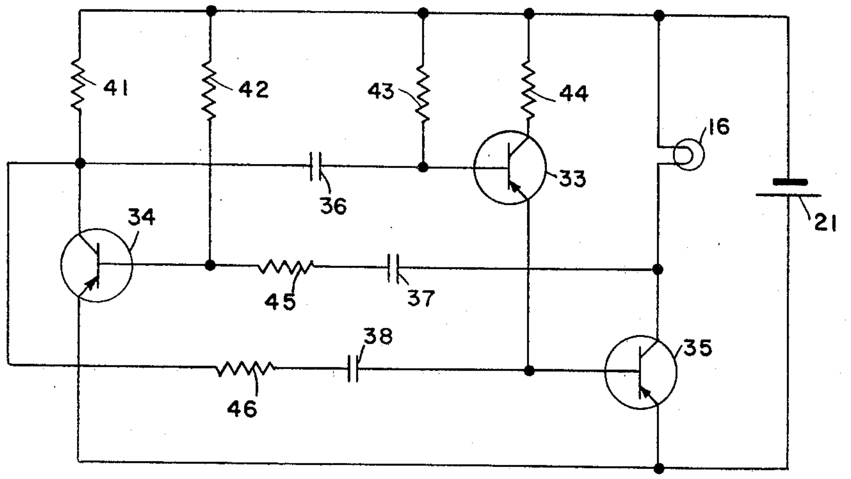
FIGURE 8 is a schematic wiring diagram of the flasher.

The lamp 16 is adjusted on its leads so the bulb is centered on the board 32. After assembly, the parts will appear as shown in FIGURES 5, 6 and 7. The schematic circuit design is shown in FIGURE 8.

The insulative board 55 is dropped into the trough with the holes in both parts concentric and the insulated wire 51 passing through them and soldered to the negative lamp terminal. The bare wire 54 is soldered to the inside of the trough.

The lamp is readjusted to center within the trough and protrude above the rim of the trough slightly less than the lamp radius.

Epoxy 18 is poured into the trough to a slightly meniscus above the rim of the trough and baked to cure the encapsulation.

When the battery 21 is inserted between the clamping fingers 24, 27, 28 and pushed in past the second detent, the eyelet terminal 22 will make contact with the negative battery terminal and the lamp will flash on for about one second and turn off for about one second and repeat the cycle of flashing until the energy of the battery is exhausted.

Flashes of different colors may be obtained by sliding colored transparent plastic strips 19 between the flanges 17 and indexing on the protruding lamp bulb with the blister 20.

Other embodiments of this invention may make use of integrated or microelectric circuits using monolithic solid state units or hybrid solid state units thus radically reducing the size of the control package.

What is claimed is:

1. A necktie clasp in combination with a flashing lamp comprising an open trough, a mounting bracket acutely formed with a first long leg and a second short leg, a notch at the free end of said second short leg, the first end of a cantilever spring located in said notch, opposing projections at the end of said notch, said projections fitting transverse holes in the clamp arm, the second end of said cantilever spring fastened to said clamp arm, said trough conductively fastened to said long leg of said mounting bracket, a battery bracket comprising a conductive finger contacting the periphery of a battery consisting of at least one cell, a restraining finger keeping said battery pressed towards said first long leg of said mounting bracket, an insulated contact near said first leg of said mounting bracket, the first end of an insulated wire attached to said contact, the second end of said insulated wire connected to a printed circuit board insulatively mounted within said trough, said printed circuit board having mounted on it at least one semiconductor, one capacitor, one resistor and one lamp, interconnected on said printed circuit board to act as a flasher turning said lamp on and off at a frequency determined by the resistance and capacitance of said circuit, said lamp centered in said trough with the bulb protruding partially above the surface of plastic encapsulant filling said trough.

2. A necktie clasp in combination with a flashing lamp incorporated therein and comprising a rectangular trough formed by side and end walls and a base, a mounting bracket consisting of a metal strip acutely formed back on itself with a first long leg and a second short leg, a notch at the free end of said second short leg, the first end of a cantilever spring terminating in said notch, said notch having opposing projections at the end of said notch, said projections fitting loosely in corresponding transverse holes in the clamp arm to provide hinge action thereto, the second end of said cantilever spring rigidly fastened to said clamp arm, said trough conductively fastened to said long leg of said mounting bracket, a battery clip comprising at least first and second diametrically opposed conductive fingers making contact with the periphery of the battery consisting of at least one cell, projections on at least one of said conductive fingers to act as detents, a confining finger urging said battery against said first long leg of said mounting bracket, an insulated contact near said first leg of said mounting bracket, the first end of an insulated wire attached to said contact, said insulated wire cemented to the surface of said first long leg of said mounting bracket, said insulated wire passing through aligned holes in base of said trough and first long leg of said mounting bracket, said second end of said insulated wire connected to a printed circuit board insulatively mounted within said trough, said printed circuit board having mounted on it at least one transistor, one capacitor, one resistor and one lamp, interconnected on said printed circuit board so as to act as a multivibrator and electronic switch turning said lamp on and off at a frequency determined by the resistance and capacitance of said resistors and capacitors, said lamp centered in said trough and the bulb protruding partially above the surface of plastic encapsulant which fills said trough to the rim thus protecting said electronic parts from shock and degrading environment.

3. In combination, a jewelry piece, lamp means carried by said jewelry piece, lamp flasher means connected to said lamp means and battery means including battery mounting bracket means carried by said jewelry piece having a plurality of finger means carried by said jewelry piece, at least two of said finger means engaging the periphery of said battery means, one of said fingers contacting said periphery of said battery including detent means for retaining said battery in one of a plurality of possible positions, and at least one of said finger means engaging an end of said battery, said plurality of finger means retaining said battery in close proximity with said jewelry piece, said battery means coupled to said lamp means through said lamp flasher means, said lamp flasher means including an electronic switch means having at least one semiconductor, capacitor and resistor interconnected so as to intermittently supply current from said battery to said lamp means thereby energizing said lamp means at a frequency determined by the resistance and capacitance of said electronic switch means.

4. In combination, a necktie clasp including trough means for seating an electronic switch means and a lamp means, lamp flasher means connected to said lamp means and battery means carried by said necktie clasp and coupled to said lamp means through said lamp flasher means, said lamp flasher means including an electronic switch means having at least one semiconductor, capacitor and resistor interconnected so as to intermittently supply current from said battery to said lamp means thereby energizing said lamp means at a frequency determined by the resistance and capacitance of said electronic switch means, said electronic switch means retained in said trough means by an encapsulant means and, said lamp means positioned in said encapsulant means and partially protruding therethrough.

5. The combination according to claim 4, wherein said encapsulant means is epoxy.

References Cited

UNITED STATES PATENTS

| | | | |
|---|---|---|---|
| 2,591,419 | 4/1952 | Gheorghiu | 240—6.4 XR |
| 2,714,152 | 7/1955 | Ackerman et al. | 240—10.65 |
| 2,734,129 | 2/1956 | Kahla | 240—46.59 |
| 2,782,296 | 2/1957 | Walter | 240—52.1 XR |
| 2,798,148 | 7/1957 | Di Lizio et al. | 240—6.4 |
| 2,854,563 | 9/1958 | Catching. | |
| 3,130,349 | 4/1964 | Mallory | 315—200.1 |
| 3,193,611 | 7/1965 | Huetten et al. | 29—627 XR |
| 3,256,428 | 6/1966 | Schwartz | 240—10.65 |

FOREIGN PATENTS

| | | |
|---|---|---|
| 969,770 | 9/1964 | Great Britain. |

NORTON ANSHER, Primary Examiner

J. F. PETERS, Jr., Assistant Examiner

U.S. Cl. X.R.

240—52.1, 59